US012300254B2

(12) United States Patent
Büthe et al.

(10) Patent No.: US 12,300,254 B2
(45) **Date of Patent: *May 13, 2025**

(54) MULTICHANNEL AUDIO CODING

(71) Applicant: Fraunhofer-Gesellschaft zur Förderung der angewandten Forschung e.V., Munich (DE)

(72) Inventors: Jan Büthe, Erlangen (DE); Eleni Fotopoulou, Erlangen (DE); Srikanth Korse, Erlangen (DE); Pallavi Maben, Erlangen (DE); Markus Multrus, Erlangen (DE); Franz Reutelhuber, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,030

(22) Filed: Sep. 8, 2023

(65) Prior Publication Data

US 2024/0112685 A1 Apr. 4, 2024

Related U.S. Application Data

(63) Continuation of application No. 17/122,403, filed on Dec. 15, 2020, now Pat. No. 11,978,459, which is a (Continued)

(30) Foreign Application Priority Data

Jun. 22, 2018 (EP) .................................... 18179373

(51) Int. Cl.
*G10L 19/008* (2013.01)

(52) U.S. Cl.
CPC .................................. *G10L 19/008* (2013.01)

(58) Field of Classification Search
CPC ..... G10L 19/008; G10L 19/002; G10L 19/06; G10L 19/04; G10L 19/032; G10L 19/00; (Continued)

(56) References Cited

U.S. PATENT DOCUMENTS

| | | | | |
|---|---|---|---|---|
| 5,789,689 A * | 8/1998 | Doidic | .................. | H03G 7/007 84/633 |
| 2003/0223597 A1* | 12/2003 | Puria | ...................... | H03G 5/005 381/104 |

(Continued)

FOREIGN PATENT DOCUMENTS

| | | |
|---|---|---|
| AU | 2019291054 B2 | 12/2019 |
| CN | 105612766 A | 5/2016 |

(Continued)

OTHER PUBLICATIONS

ISO/IEC DIS 23008-3. Information technology—High efficiency coding and media delivery in heterogeneous environments—Part 3: 3D audio. ISO/IEC JTC 1/SC 29/WG 11. Aug. 5, 2014.

(Continued)

*Primary Examiner* — Leshui Zhang
(74) *Attorney, Agent, or Firm* — Haynes and Boone, LLP

(57) ABSTRACT

In multichannel audio coding, improved computational efficiency is achieved by computing comparison parameters for ITD compensation between any two channels in the frequency domain for a parametric audio encoder. This may mitigate negative effects on encoder parameter estimates.

4 Claims, 3 Drawing Sheets

Related U.S. Application Data continuation of application No. PCT/EP2019/066228, filed on Jun. 19, 2019.

(58) Field of Classification Search

CPC ....... G10L 19/08; G10L 19/20; G10L 19/022; G10L 19/005; G10L 19/02; G10L 19/012; H04S 3/00; H04S 3/008; H04S 1/002

USPC ................................. 704/500–504; 381/1–23

See application file for complete search history.

(56) References Cited

U.S. PATENT DOCUMENTS

| | | | | |
|---|---|---|---|---|
| 2005/0149322 | A1* | 7/2005 | Bruhn | G10L 19/008 704/211 |
| 2006/0133618 | A1 | 6/2006 | Villemoes et al. | |
| 2008/0195397 | A1 | 8/2008 | Myburg et al. | |
| 2009/0313028 | A1* | 12/2009 | Tammi | G10L 19/265 704/500 |
| 2013/0304481 | A1* | 11/2013 | Briand | G10L 19/008 704/500 |
| 2014/0372107 | A1* | 12/2014 | Vilermo | G10L 19/0204 704/205 |
| 2015/0162012 | A1* | 6/2015 | Kastner | G10L 19/008 704/500 |
| 2017/0061972 | A1 | 3/2017 | Briand et al. | |
| 2018/0102131 | A1 | 4/2018 | Lee et al. | |

FOREIGN PATENT DOCUMENTS

| | | | | | |
|---|---|---|---|---|---|
| CN | 107430863 | A | 12/2017 | | |
| EP | 3067889 | A1 | 9/2016 | | |
| JP | 2017-167566 | A | 9/2017 | | |
| KR | 20170042809 | A | 4/2017 | | |
| TW | 201505024 | A | 2/2015 | | |
| TW | 201637000 | A | 10/2016 | | |
| TW | 201740368 | A | 11/2017 | | |
| WO | WO 2017/125562 | A1 | 7/2017 | | |
| WO | WO-2017125563 | A1 * | 7/2017 | | G10L 19/008 |
| WO | WO-2017153466 | A1 * | 9/2017 | | G10L 19/008 |
| WO | WO-2018086947 | A1 * | 5/2018 | | G10L 19/008 |
| WO | WO-2020126120 | A1 * | 6/2020 | | G10L 19/005 |

OTHER PUBLICATIONS

Bertrand Fatus. Parametric Coding for Spatial Audio. Master's Thesis, KTH, Stockholm, Sweden. Dec. 2015.

Office Action dated Jun. 21, 2021 issued in the parallel Russian patent application No. 2021101191 (12 pages with English translation).

MPEG-4 High Efficiency Advanced Audio Coding (HE-AAC) v2 (ISO/IEC 14496-3:2009).

Jürgen Herre: "From Joint Stereo to Spatial Audio Coding—Recent Progress and Standardization"; Proc. of the 7th Int. Conference on digital Audio Effects (DAFX-04), Naples, Italy, Oct. 5-8, 2004.

Christoph Tourney et al.: "Improved Time Delay Analysis/Synthesis for Parametric Stereo Audio Coding", AES Convention Paper 6753, 2006.

Christof Faller et al.: "Binaural Cue Coding Part II: Schemes and Applications", IEEE Transactions on Speech and Audio Processing, vol. 11, No. 6, Nov. 2003.

Yue Lang et al.: "Novel Low Complexity Coherence Estimation and Synthesis Algorithms for Parametric Stereo Coding", EUSIPCO, Aug. 27, 2012, pp. 2427-2431, XP055042916.

Office Action dated Sep. 15, 2022 issued in the parallel Argentinian patent application No. AR 115600 A1 (5 pages).

* cited by examiner

MULTICHANNEL AUDIO CODING

CROSS-REFERENCES TO RELATED APPLICATIONS

This application is a continuation of copending U.S. patent application Ser. No. 17/122,403 filed Dec. 15, 2020 which is a continuation of International Application No. PCT/EP2019/066228, filed Jun. 19, 2019, which is incorporated herein by reference in its entirety, and additionally claims priority from European Application No. EP 18179373.8, filed Jun. 22, 2018, which is incorporated herein by reference in its entirety.

The present application concerns parametric multichannel audio coding.

BACKGROUND OF THE INVENTION

The state of the art method for lossy parametric encoding of stereo signals at low bitrates is based on parametric stereo as standardized in MPEG-4 Part 3 [1]. The general idea is to reduce the number of channels of a multichannel system by computing a downmix signal from two input channels after extracting stereo/spatial parameters which are sent as side information to the decoder. These stereo/spatial parameters may usually comprise inter-channel-level-difference ILD, inter-channel-phase-difference IPD, and inter-channel-coherence ICC, which may be calculated in sub-bands and which capture the spatial image to a certain extend.

However, this method is incapable of compensating or synthesizing inter-channel-time-differences (ITDs) which is e.g. desirable for downmixing or reproducing speech recorded with an AB microphone setting or for synthesizing binaurally rendered scenes. The ITD synthesis has been addressed in binaural cue coding (BCC) [2], which typically uses parameters ILD and ICC, while ITDs are estimated and channel alignment is performed in the frequency domain.

Although time-domain ITD estimators exist, it is usually advantageous for an ITD estimation to apply a time-to-frequency transform, which allows for spectral filtering of the cross-correlation function and is also computationally efficient. For complexity reasons, it is desirable to use the same transforms which are also used for extracting stereo/spatial parameters and possibly for downmixing channels, which is also done in the BCC approach.

This, however, comes with a drawback: accurate estimation of stereo parameters is ideally performed on the aligned channels. But if the channels are aligned in the frequency domain, e.g. by a circular shift in the frequency domain, this may cause an offset in the analysis windows, which may negatively affect the parameter estimates. In the case of BCC, this mainly affects the measurement of ICC, where increasing window offsets eventually push the ICC value towards zero even if the input signals are actually totally coherent.

SUMMARY

One embodiment may have a comparison device for a multi-channel audio signal that may be configured to: derive, for an inter-channel time difference between audio signals for at least one pair of channels, at least one ITD parameter of the audio signals of the at least one pair of channels in an analysis window, compensate the ITD for the at least one pair of channels in the frequency domain by circular shift using the at least one ITD parameter to generate at least one pair of ITD compensated frequency transforms, compute, based on the at least one ITD parameter and the at least one pair of ITD compensated frequency transforms, at least one comparison parameter.

According to another embodiment, a multi-channel encoder may have the inventive comparison device and may further be configured to: encode the at least one downmix signal, the at least one ITD parameter and the at least one comparison parameter for transmission to a decoder.

Yet another embodiment may have a decoder for multi-channel audio signals that may be configured to: decode at least one downmix signal, at least one inter-channel time difference parameter and at least one comparison parameter received from an encoder, upmix the at least one downmix signal for restoring the audio signals of at least one pair of channels from the at least one downmix signal using the at least one comparison parameter to generate at least one pair of decoded ITD compensated frequency transforms, decompensate the ITD for the at least one pair of decoded ITD compensated frequency transforms of the at least one pair of channels in the frequency domain by circular shift using the at least one ITD parameter to generate at least one pair of ITD decompensated decoded frequency transforms for reconstructing the ITD of the audio signals of the at least one pair of channels in the time domain, inverse frequency transform the at least one pair of ITD decompensated decoded frequency transforms to generate at least one pair of decoded audio signals of the at least one pair of channels.

According to another embodiment, a comparison method for a multi-channel audio signal may have the steps of: deriving, for an inter-channel time difference between audio signals for at least one pair of channels, at least one ITD parameter of the audio signals of the at least one pair of channels in an analysis window, compensating the ITD for the at least one pair of channels in the frequency domain by circular shift using the at least one ITD parameter to generate at least one pair of ITD compensated frequency transforms, computing, based on the at least one ITD parameter and the at least one pair of ITD compensated frequency transforms, at least one comparison parameter.

The present application is based on the finding that in multichannel audio coding, an improved computational efficiency may be achieved by computing at least one comparison parameter for ITD compensation between any two channels in the frequency domain to be used by a parametric audio encoder. Said at least one comparison parameter may be used by the parametric encoder to mitigate the above-mentioned negative effects on the spatial parameter estimates.

An embodiment may comprise a parametric audio encoder that aims at representing stereo or generally spatial content by at least one downmix signal and additional stereo or spatial parameters. Among these stereo/spatial parameters may be ITDs, which may be estimated and compensated in the frequency domain, prior to calculating the remaining stereo/spatial parameters. This procedure may bias other stereo/spatial parameters, a problem that otherwise would have to be solved in a costly way be re-computing the frequency-to-time transform. In said embodiment, this problem may be rather mitigated by applying a computationally cheap correction scheme which may use the value of the ITD and certain data of the underlying transform.

An embodiment relates to a lossy parametric audio encoder which may be based on a weighted mid/side transformation approach, may use stereo/spatial parameters IPD, ITD, as well as two gain factors and may operate in the frequency domain. Other embodiments may use a different transformation and may use different spatial parameters as appropriate.

In an embodiment, the parametric audio encoder may be both capable of compensating and synthesizing ITDs in frequency domain. It may feature a computationally efficient gain correction scheme which mitigates the negative effects of the aforementioned window offset. Also a correction scheme for the BCC coder is suggested.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
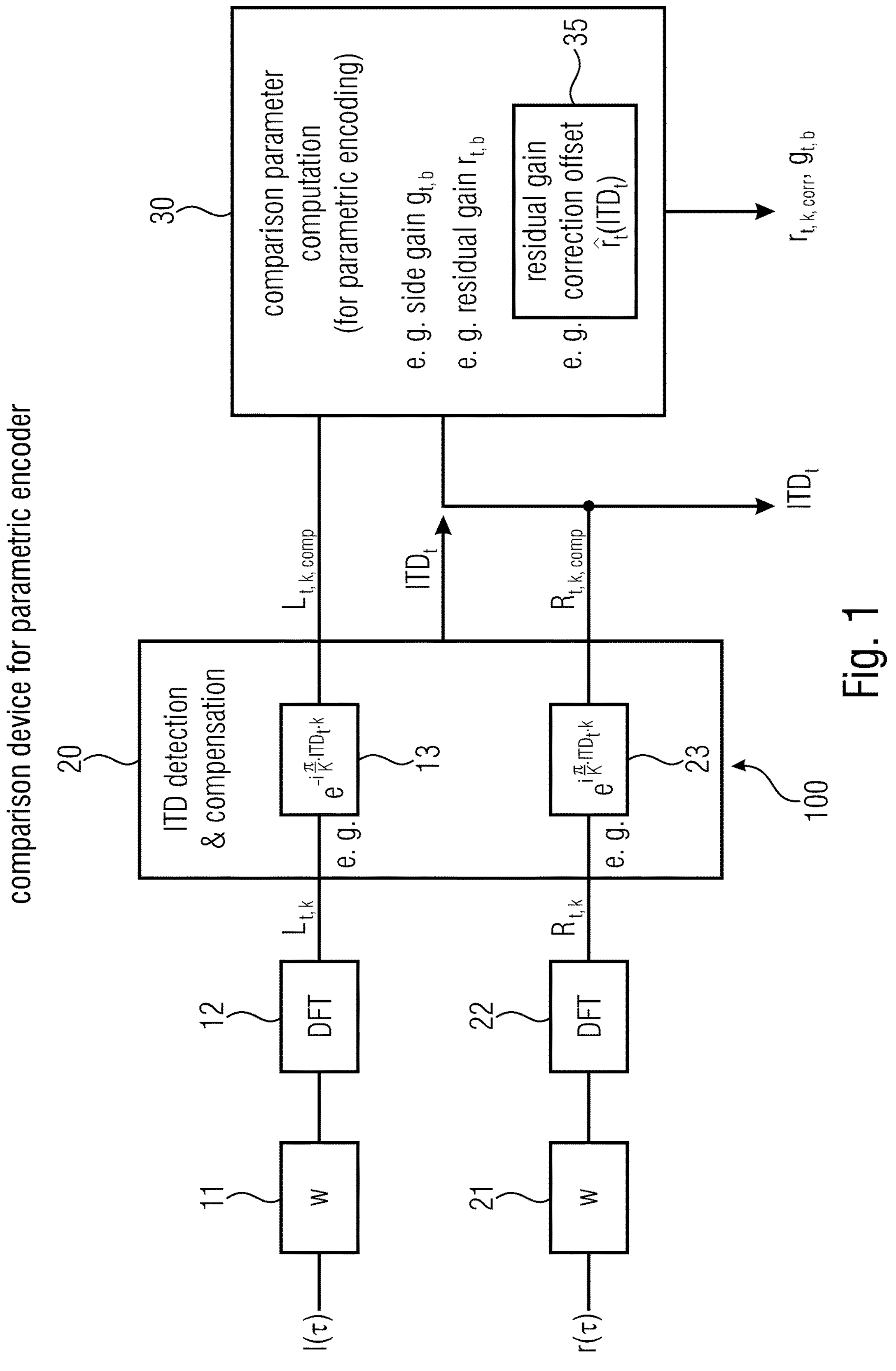
FIG. 1 shows a block diagram of a comparison device for a parametric encoder according to an embodiment of the present application.

FIG. 1 shows a comparison device 100 for a multi-channel audio signal. As shown, it may comprise an input for audio signals for a pair of stereo channels, namely a left audio channel signal $l(\tau)$ and a right audio channel signal $r(\tau)$. Other embodiments, may of course comprise a plurality of channels to capture the spatial properties of sound sources.

Before transforming the time domain audio signals $l(\tau)$, $r(\tau)$ to the frequency domain, identical overlapping window functions 11, 21 $w(\tau)$ may be applied to the left and right input channel signals $l(\tau)$, $r(\tau)$ respectively. Moreover, in embodiments, a certain amount of zero padding may be added which allows for shifts in the frequency domain. Subsequently, the windowed audio signals may be provided to corresponding discrete Fourier transform (DFT) blocks 12, 22 to perform corresponding time to frequency transforms. These may yield time-frequency bins $L_{t,k}$ and $R_{t,k}$, k=0, . . . ,K—1 as frequency transforms of the audio signals for the pair of channels.

Said frequency transforms $L_{t,k}$ and $R_{t,k}$, may be provided to an ITD detection and compensation block 20. The latter may be configured to derive, to represent the ITD between the audio signals for the pair of channels, an ITD parameter, here $ITD_t$, using the frequency transforms $L_{t,k}$ and $R_{t,k}$ of the audio signals of the pair of channels in said analysis windows $w(\tau)$. Other embodiments may use different approaches to derive the ITD parameter which might also be determined before the DFT blocks in the time domain.

ITDITD$L_{t,k}R_{t,k}(L_{t,k}R_{t,k}{}^*\omega_{t,k})_k$ The deriving of the parameter for calculating an may involve calculation of a ITDITD$L_{t,k}R_{t,k}(L_{t,k}R_{t,k}{}^*\omega_{t,k})_k$—possibly weighted—auto- or cross-correlation function. Conventionally, this may be calculated from the time-frequency bins and by applying the inverse discrete Fourier transform (IDFT) to the term.

The proper way to compensate the measured ITD would be to perform a channel alignment in time domain and then apply the same time to frequency transform again to the shifted channel[s] in order to obtain ITD compensated time frequency bins. However, to save complexity, this procedure may be approximated by performing a circular shift in frequency domain. Correspondingly, ITD compensation may be performed by the ITD detection and compensation block 20 in the frequency domain, e.g. by performing the circular shifts by circular shift blocks 13 and 23 respectively to yield $$L_{t,k,comp} \leftarrow e^{-i\frac{\pi}{K}ITD_t k} L_{t,k} \tag{1}$$

and $$R_{t,k,comp} \leftarrow e^{i\frac{\pi}{K}ITD_t k} R_{t,k}, \tag{2}$$

where $ITD_t$ may denote the ITD for a frame t in samples.

In an embodiment, this may advance the lagging channel and may delay the lagging channel by $ITD_t/2$ samples. However, in another embodiment—if delay is critical—it may be beneficial to only advance the lagging channel by $ITD_t$ samples, which does not increase the delay of the system.

As a result, ITD detection and compensation block 20 may compensate the ITD for the pair of channels in the frequency domain by circular shift[s] using the ITD parameter $ITD_t$ to generate a pair of ITD compensated frequency transforms $L_{t,k,comp}$, $R_{t,k,comp}$ at its output. Moreover, the ITD detection and compensation block 20 may output the derived ITD parameter, namely $ITD_t$, e.g. for transmission by a parametric encoder.

As show in FIG. 1, comparison and spatial parameter computation block 30 may receive the ITD parameter $ITD_t$ and the pair of ITD compensated frequency transforms $L_{t,k,comp}$, $R_{t,k,comp}$ as its input signals. Comparison and spatial parameter computation block 30 may use some or all of its input signals to extract stereo/spatial parameters of the multi-channel audio signal such as inter-phase-difference IPD.

Moreover, comparison and spatial parameter computation block 30 may generate—based on the ITD parameter $ITD_t$ and the pair of ITD compensated frequency transforms $L_{t,k,comp}$, $R_{t,k,comp}$—at least one comparison parameter, here two gain factors $g_{t,b}$ and $r_{t,b,corr}$, for a parametric encoder. Other embodiments may additionally or alternatively use the frequency transforms $L_{t,k}$, $R_{t,k}$ and/or the spatial/stereo parameters extracted in comparison and spatial parameter computation block 30 to generate at least one comparison parameter.

The at least one comparison parameter may serve as part of a computationally efficient correction scheme to mitigate the negative effects of the aforementioned offset in the analysis windows $w(\tau)$ on the spatial/stereo parameter estimates for the parametric encoder, said offset caused by the alignment of the channels by the circular shifts in the DFT domain within ITD detection and compensation block 20. In an embodiment, at least one comparison parameter may be computed for restoring the audio signals of the pair of channels at a decoder, e.g. from a downmix signal.

Figure 2:
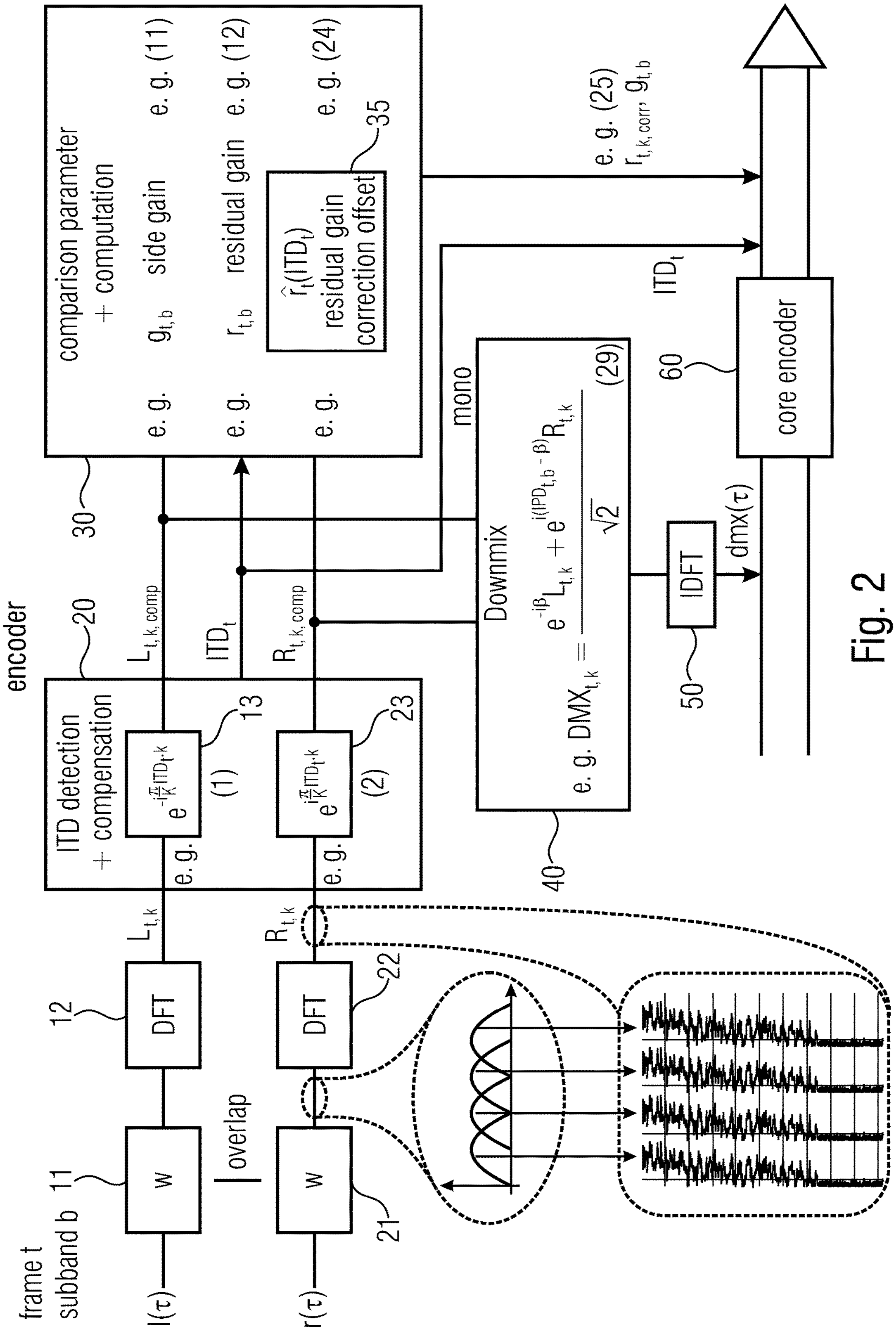
FIG. 2 shows a block diagram of a parametric encoder according to an embodiment of the present application.

FIG. 2 shows an embodiment of such a parametric encoder 200 for stereo audio signals in which the comparison device 100 of FIG. 1 may be used to provide the ITD parameter $ITD_t$, the pair of ITD compensated frequency transforms $L_{t,k,comp}$, $R_{t,k,comp}$ and the comparison parameters $r_{t,b,corr}$ and $g_{t,b}$.

The parametric encoder 200 may generate a downmix signal $DMX_{t,k}$ in downmix block 40 for the left and right input channel signals $l(\tau)$, $r(\tau)$ using the ITD compensated frequency transforms $L_{t,k,comp}$, $R_{t,k,comp}$ as input. Other embodiments may additionally or alternatively use the frequency transforms $L_{t,k}$, $R_{t,k}$ to generate the downmix signal $DMX_{t,k}$.

The parametric encoder 200 may calculate stereo parameters—such as e.g. IPD—on a frame basis in comparison and spatial parameter calculation block 30. Other embodiments may determine different or additional stereo/spatial parameters. The encoding procedure of the parametric encoder 200 embodiment in FIG. 2 may roughly follow the following steps, which are described in detail below.

1. Time to frequency transform of input signals using windowed DFTs
   in window and DFT blocks 11, 12, 21, 22
2. ITD estimate and compensation in the frequency domain
   in ITD detection and compensation block 20
3. Stereo parameter extraction and comparison parameter calculation
   in comparison and spatial parameter computation block 30
4. Downmixing
   in downmixing block 40
5. Frequency-to-time transform followed by windowing and overlap add
   in IDFT block 50

The parametric audio encoder 200 embodiment in FIG. 2 may be based on a weighted mid/side transformation of the input channels in the frequency domain using the ITD compensated frequency transforms $L_{t,k,comp}$, $R_{t,k}$, comp as well as the ITD as input. It may further compute stereo/spatial parameters, such as IPD, as well as two gain factors capturing the stereo image. It may mitigate the negative effects of the aforementioned window offset.

For spatial parameter extraction in comparison and spatial parameter computation block 30, the ITD compensated time-frequency bins $L_{t,k,comp}$, $R_{t,k}$, comp may be grouped in sub-bands, and for each sub-band the inter-phase-difference IPD and the two gain factors may be computed. Let $I_b$ denote the indices of frequency bins in sub-band b. Then the IPD may be calculated as $$IPD_{t,b}=\arg\left(\sum_{k\in I_b}L_{t,k,comp}R_{t,k,comp}^*\right). \quad (3)$$

The two above-mentioned gain factors may be related to band-wise phase compensated mid/side transforms of the pair of ITD compensated frequency transforms $L_{t,k,comp}$ and $R_{t,k,comp}$ given by equations (4) and (5) as $$M_{t,k}=L_{t,k,comp}+e^{iIPD_{t,b}}R_{t,k,comp} \quad (4)$$

and $$r_{t,b}=\left(\frac{\sum_{k\in I_b}|\rho_{t,k}|^2}{\sum_{k\in I_b}|M_{t,k}|^2}\right)^{1/2} \quad (8)$$

for $k\in I_b$.

The first gain factor $g_{t,b}$ of said gain factors may be regarded as the optimal prediction gain for a band-wise prediction of the side signal transform $S_t$ from the mid signal transform $M_t$ in equation (6):

$$S_{t,k}=g_{t,b}M_{t,k}+\rho_{t,k} \quad (6)$$

such that the energy of the prediction residual $\rho_{t,k}$ in equation (6) as given by equation (7) as $$\sum_{k\in I_b}|\rho_{t,k}|^2 \quad (7)$$

is minimal. This first gain factor $g_{t,b}$ may be referred to as side gain.

The second gain factor $r_{t,b}$ describes a ratio of the energy of the prediction residual $\rho_{t,k}$ relative to the energy of the mid signal transform $M_{t,k}$ given by equation (8) as $$r_{t,b}=\left(\frac{\sum_{k\in I_b}|\rho_{t,k}|^2}{\sum_{k\in I_b}|M_{t,k}|^2}\right)^{1/2} \quad (8)$$

and may be referred to as residual gain. The residual gain $r_{t,b}$ may be used at the decoder such as the decoder embodiment in FIG. 3 to shape a suitable replacement for the prediction residual $\rho_{t,k}$ of the mid/side transform.

In the encoder embodiment shown in FIG. 2, both gain factors $g_{t,b}$ and $r_{t,b}$ may be computed as comparison parameters in comparison and spatial parameter computation block 30 using the energies $E_{L,t,b}$ and $E_{R,t,b}$ of the ITD compensated frequency transforms $L_{t,k,comp}$ and $R_{t,k,comp}$ given in equations (9) as $$E_{L,t,b}=\sum_{k\in I_b}|L_{t,k,comp}|^2 \text{ and } E_{R,t,b}=\sum_{k\in I_b}|R_{t,k,comp}|^2 \quad (9)$$

and the absolute value of their inner product $$X_{L/R,t,b}=\left|\sum_{k\in I_b}L_{t,k,comp}R_{t,k,comp}^*\right| \quad (10)$$

given in equation (10).

Based on said energies $E_{L,t,b}$ and $E_{R,t,b}$ together with the inner product $X_{L/R,t,b}$, the side gain factor $g_{t,b}$ may be calculated using equation (11) as $$g_{t,b}=\frac{E_{L,t,b}-E_{R,t,b}}{E_{L,t,p}+E_{R,t,b}+2X_{L/R,t,b}}. \quad (11)$$

Furthermore, the residual gain factor $r_{t,b}$ may be calculated based on said energies $E_{L,t,b}$ and $E_{R,t,b}$ together with the inner product $X_{L/R,t,b}$ and the the side gain factor $g_{t,b}$ using equation (12) as $$r_{t,b}=\left(\frac{(1-g_{t,b})E_{L,t,b}+(1+g_{t,b})E_{R,t,p-2X_{L/R,t,b}}}{E_{L,t,b}+E_{R,t,b}+2X_{L/R,t,p}}\right)^{1/2}. \quad (12)$$

In other embodiments, other approaches and/or equations may be used to calculate the side gain factor $g_{t,b}$ and the residual gain factor $r_{t,b}$ and/or different comparison parameters as appropriate.

As mentioned before, the ITD compensation in frequency domain typically saves complexity but—without further measures—comes with a drawback. Ideally, for clean anechoic speech recorded with an AB-microphone set-up, the left channel signal $l(\tau)$ is substantially a delayed (by delay d) and scaled (by gain c) version of the right channel $r(\tau)$. This situation may be expressed by the following equation (13) in which $$l(\tau)=cr(\tau-d) \quad (13).$$

After proper ITD compensation of the unwindowed input channel audio signals $l(\tau)$ and $r(\tau)$, an estimate for the side gain factor $g_{t,b}$ would be given in equation (14) as $$g_{t,b}=\frac{c-1}{c+1} \quad (14)$$

with a disappearing residual gain factor $r_{t,b}$ given as $$r_{t,b}=0 \tag{15}$$

However, if channel alignment is performed in the frequency domain as in the embodiment in FIG. 2 by ITD detection and compensation block 20 using circular shift blocks 13 and 23 respectively, the corresponding DFT analysis windows $w(\tau)$ are rotated as well. Thus, after compensating ITDs in the frequency domain, the ITD compensated frequency transform $R_{t,k,comp}$ for the right channel may be determined in form of time-frequency bins by the DFT of $$w(\tau)r(\tau), \tag{16}$$

whereas the ITD compensated frequency transform $L_{t,k,comp}$ for the left channel may be determined in form of time-frequency bins as the DFT of $$w(\tau+ITD_t)r(\tau). \tag{17}$$

wherein w is the DFT analysis window function.

Figure 3:
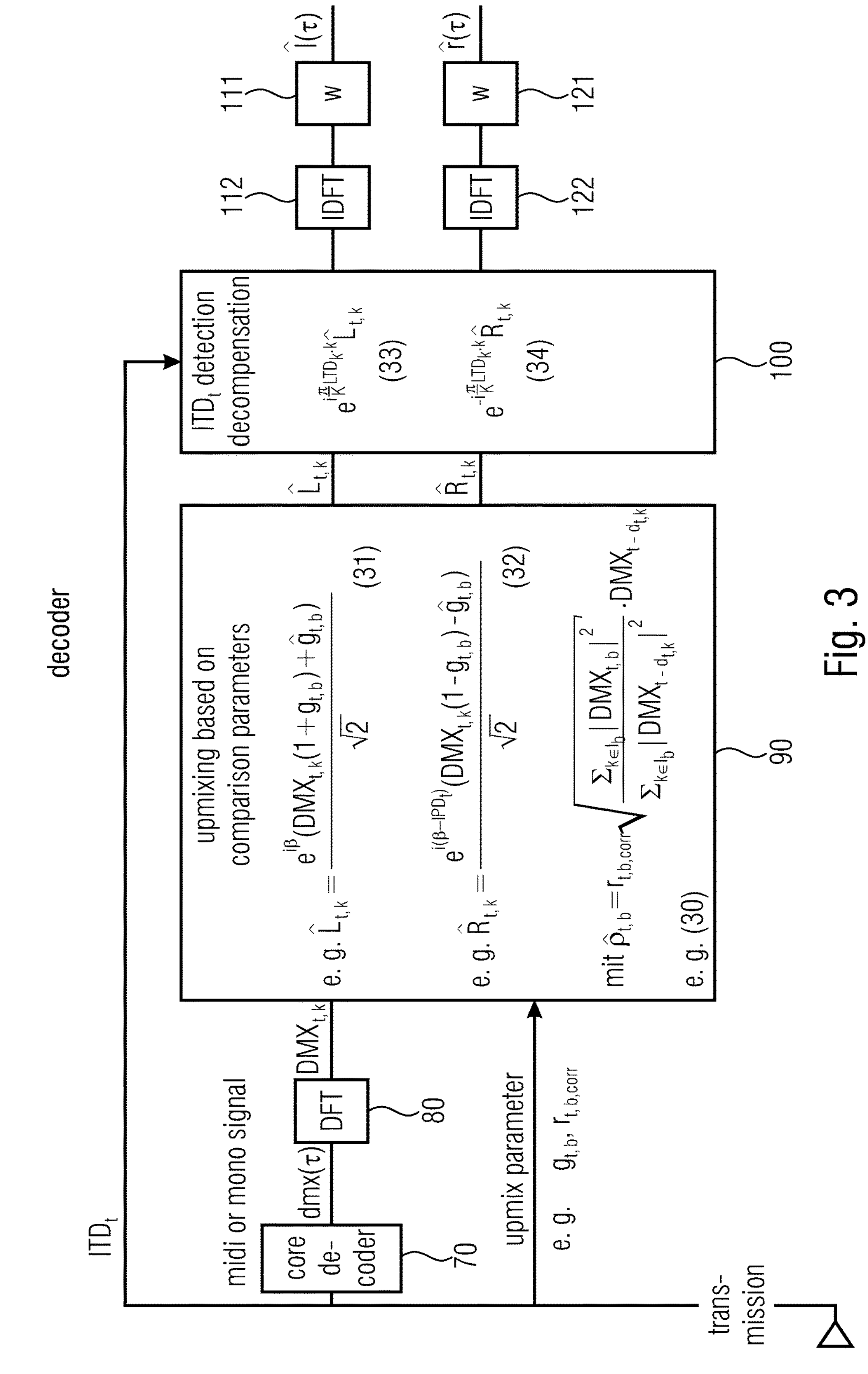
FIG. 3 shows a block diagram of a parametric decoder according to an embodiment of the present application.

It has been observed that such channel alignment in the frequency domain mainly affects the residual prediction gain factor $r_{t,b}$, which grows larger with increasing $ITD_t$. Without any further measures, the channel alignment in the frequency domain would thus add additional ambience to an output audio signal at a decoder as shown in FIG. 3. This additional ambience is undesired, especially when the audio signal to be encoded contains clean speech, since artificial ambience impairs speech intelligibility.

Consequently, the above-described effect may be mitigated by correcting the (prediction) residual gain factor $r_{t,b}$ in the presence of non-zero ITDs using a further comparison parameter.

In an embodiment, this may be done by calculating a gain offset for the residual gain $r_{t,b}$, which aims at matching an expected residual signal $e(\tau)$ when the signal is coherent and temporally flat. In this case, one expects a global prediction gain $\hat{g}$ given by equation (18) as $$\hat{g}=\frac{c+1}{c-1} \tag{18}$$

and a disappearing global $\hat{IPD}$ given by $\hat{IPD}=0$. Consequently, the expected residual signal $e(\tau)$ may be determined using equation (19) as $$e(\tau)=\frac{2c}{1+c}(w(\tau)-w(\tau+ITD_t))r(\tau). \tag{19}$$

In an embodiment, the further comparison parameter besides side gain factor $g_{t,b}$ and residual gain factor $r_{t,b}$ may be calculated based on the expected residual signal $e(\tau)$ in comparison and spatial parameter computation block 30 using the ITD parameter $ITD_t$ and a function equaling or approximating an autocorrelation function $W_X(n)$ of the analysis window function w given in equation (20) as $$W_X(n)=\Sigma_\tau w(\tau)w(\tau+n) \tag{20}$$

If $M_r$ denotes the short term mean value of $r^2(\tau)$ the energy of the expected residual signal $e(\tau)$ may approximately be calculated by equation (21) as $$\frac{8c^2}{(1+c)^2}(W_X(0)-W_X(ITD_t))M_r. \tag{21}$$

With the windowed mid signal given by equation (22) as $$m_t(\tau)=(w_t(\tau)+c\ w_t(\tau+ITD_t))r(\tau), \tag{22}$$

the energy of this windowed mid signal $m_t(\tau)$ may be approximated by equation (23) as $$[(1+c^2)W_X(0)+2cW_X(ITD_t)]M_r. \tag{23}$$

In an embodiment, the above-mentioned function used in the calculation of the comparison parameter in comparison and spatial parameter computation block 30 equals or approximates a normalized version $\hat{W}_X(n)$ of the autocorrelation function $\hat{W}_X(n)$ of the analysis window as given in equation (23a) as $$\hat{W}_X(n)=W_X(n)/W_X(0) \tag{23a}$$

Based on this normalized autocorrelation function $\hat{W}_X(n)$, said further comparison parameter f t may be calculated using equation (24) as $$\hat{r}_t=\frac{2c}{c+1}\sqrt{2\frac{1-\hat{W}_X(ITD_t)}{1+c^2+2c\hat{W}_X(ITD_t)}} \tag{24}$$

to provide an estimated correction parameter for the residual gain $r_{t,b}$. In an embodiment, comparison parameter $\hat{r}_t$ may be used as an estimate for the local residual gains $r_{t,b}$ in sub-bands b. In another embodiment, the correction of the residual gains $r_{t,b}$ may be affected by using comparison parameter $\hat{r}_t$ as an offset. I.e. the values of the residual gain $r_{t,b}$ may be replaced by a corrected residual gain $r_{t,b,corr}$ as given in equation (25) as $$r_{t,b,corr}\leftarrow\max\{0,r_{t,b}-\hat{r}_t\} \tag{25}$$

Thus, in an embodiment, a further comparison parameter calculated in comparison and spatial parameter computation block 30 may comprise the corrected residual gain $r_{t,b,corr}$ that corresponds to the residual gain $r_{t,b}$ corrected by the residual gain correction parameter $\hat{r}_t$ as given in equation (24) in form of the offset defined in equation (25).

Hence, a further embodiment relates to parametric audio coding using windowed DFT and [a subset of] parameters IPD according to equation (3), side gain $g_{t,b}$ according to equation (11), residual gain $r_{t,b}$ b according to equation (12) and ITDs, wherein the residual gain $r_{t,b}$ is adjusted according to equation (25).

In an empirical evaluation, the residual gain estimates $\hat{r}_t$ may be tested with different choices for the right channel audio signal $r(\tau)$ in equation (13). For white noise input signals $r(\tau)$, which satisfy the temporal flatness assumption, the residual gain estimates $\hat{r}_t$ are quite close to the average of the residual gains $r_{t,b}$ measured in sub-bands as can be seen from table 1 below.

TABLE 1

$r_{t,\,b}$ITD$\hat{r}_t$
Average of measured residual gains for panned white noise $r_{t,\,b}$ITD$\hat{r}_t$with and residual gain estimates (stated in brackets).

| ITD\c | 1 | 2 | 4 | 8 | 16 | 32 |
|---|---|---|---|---|---|---|
| ms | 0.0893 | 0.0793 | 0.0569 | 0.0351 | 0.0196 | 0.0104 |
| | (0.0885) | (0.0785) | (0.0565) | (0.0349) | (0.0195) | (0.0104) |
| ms | 0.1650 | 0.1460 | 0.1045 | 0.0640 | 0.0357 | 0.0189 |
| | (0.1631) | (0.1458) | (0.1039) | (0.0640) | (0.0357) | (0.0189) |
| ms | 0.2348 | 0.2073 | 0.1472 | 0.0896 | 0.0498 | 0.0263 |
| | (0.2327) | (0.2062) | (0.1473) | (0.0904) | (0.0504) | (0.0267) |
| ms | 0.3005 | 0.2644 | 0.1862 | 0.1125 | 0.0621 | 0.0327 |
| | (0.2992) | (0.2627) | (0.1885) | (0.1151) | (0.0641) | (0.0339) |

For speech signals r(τ), the temporal flatness assumption is frequently violated, which typically increases the average of the residual gains $r_{t,b}$ (see table 2 below compared to table 1 above). The method of residual gain adjustment or correction according to equation (25) may therefore be considered as being rather conservative. However, it may still remove most of the undesired ambience for clean speech recordings.

TABLE 2

$r_{t,\,b}$ITD$\hat{r}_t$
Average of measured residual gains for panned mono speech $r_{t,\,b}$ITD$\hat{r}_t$with and residual gain estimates (stated in brackets).

| ITD\c | 1 | 2 | 4 |
|---|---|---|---|
| ms | 0.1055 | 0.1022 | 0.0874 |
| | (0.0885) | (0.0785) | (0.0565) |
| ms | 0.1782 | 0.1634 | 0.1283 |
| | (0.1631) | (0.1458) | (0.1039) |
| ms | 0.2435 | 0.2191 | 0.1657 |
| | (0.2327) | (0.2062) | (0.1473) |
| ms | 0.3050 | 0.2720 | 0.2014 |
| | (0.2992) | (0.2627) | (0.1885) |

The normalized autocorrelation function $\hat{W}_X$ given in equation (23a) may be considered to be independent of the frame index t in case a single analysis window w is used. Moreover, the normalized autocorrelation function $\hat{W}_X$ may be considered to vary very slowly for typical analysis window functions w. Hence, $\hat{W}_X$ may be interpolated accurately from a small table of values, which makes this correction scheme very efficient in terms of complexity.

Thus, in embodiments, the function for the determination of the residual gain estimates or residual gain correction offset $\hat{r}_t$ as a comparison parameter in block 30 may be obtained by interpolation of the normalized version $\hat{W}_X$ of the autocorrelation function of the analysis window stored in a look-up table. In other embodiment, other approaches for an interpolation of the normalized autocorrelation function $\hat{W}_X$ may be used as appropriate.

For BCC, as described in [2], a similar problem may arise when estimating inter-channel-coherence ICC in sub-bands. In an embodiment, the corresponding $ICC_{t,b}$ may be estimated by equation (26) using the energies $E_{L,t,b}$ and $E_{R,t,b}$ of equation (9) and the inner product of equation (10) as $$ICC_{t,b} = \frac{X_{L/R,t,b}}{\sqrt{E_{L,t,b} \cdot E_{R,t,b}}}. \tag{26}$$

By definition, the ICC is measured after compensating the ITDs. However, the non-matching window functions w may bias the ICC measurement. In the above-mentioned clean anechoic speech setting described by equation (13), the ICC would be 1 if calculated on properly aligned input channels.

However, the offset—caused by the rotation of the analysis windows functions w(τ) in the frequency domain when compensating an ITD of $ITD_t$ in frequency domain by circular shift[s]—may bias the measurement of the ICC towards $I\hat{C}C_t$ as given in equation (27) as $$I\hat{C}C_t = \hat{W}_X(ITD_t) \tag{27}.$$

In an embodiment, the bias of the ICC may be corrected in a similar way compared to the correction of the residual gain $r_{t,b}$ in equation (25), namely by making the replacement as given in equation (28) as $$ICC_{b,t} \leftarrow 1 + \min\{ICC_{b,t} - I\hat{C}C_t, 0\} \tag{28}.$$

Thus, a further embodiment relates to parametric audio coding using windowed DFT and [a subset of] parameters IPD according to equation (3), ILD, ICC according to equation (26) and ITDs, wherein the ICC is adjusted according to equation (28).

In the embodiment of parametric encoder 200 shown in FIG. 2, downmixing block 40 may reduce the number of channels of the multichannel, here stereo, system by computing a downmix signal $DMX_{t,k}$ given by equation (29) in the frequency domain. In an embodiment, the downmix signal $DMX_{t,k}$ may be computed using the ITD compensated frequency transforms $L_{t,k,comp}$ and $R_{t,k,comp}$ according to $$DMX_{t,k} = \frac{e^{-i\beta} L_{t,k,comp} + e^{i(IPD_{t,p} - \beta)} R_{t,k,comp}}{\sqrt{2}}. \tag{29}$$

In equation (29), β may be a real absolute phase adjusting parameter calculated from the stereo/spatial parameters. In other embodiments, the coding scheme as shown in FIG. 2 may also work with any other downmixing method. Other embodiments may use the frequency transforms $L_{t,k}$ and $R_{t,k}$ and optionally further parameters to determine the downmix signal $DMX_{t,k}$.

$DMX_{t,k}DMX_{t,k}$k=0, . . . , K−1dmx(τ)$w_S$(τ)dmx(τ)In the encoder embodiment of FIG. 2, an inverse discrete Fourier transform (IDFT) block 50 may receive the frequency domain downmix signal from downmixing block 40. IDFT block 50 may transform downmix time-frequency bins, $DMX_{t,k}DMX_{t,k}$k=0, . . . , K−1dmx(τ)$w_S$(τ)dmx(τ), from the frequency domain to the time domain to yield time domain downmix signal. In embodiments, a synthesis window may be applied and added to the time domain downmix signal.

Furthermore, as in the embodiment in FIG. 2, a core encoder 60 may receive domain downmix signal dmx(T) to encode the single channel audio signal according to MPEG-4 Part 3 [1] or any other suitable audio encoding algorithm as appropriate. In the embodiment of FIG. 2, the core-encoded time domain downmix signal dmx(τ) may be combined with the ITD parameter $ITD_t$, the side gain $g_{t,b}$ and the corrected residual gain $r_{t,b,corr}$ suitably processed and/or further encoded for transmission to a decoder.

FIG. 3. shows an embodiment of multichannel decoder. The decoder may receive a combined signal comprising the mono/downmix input signal dmx(τ) in the time domain and comparison and/or spatial parameters as side information on a frame basis. The decoder as shown in FIG. 3 may perform the following steps, which are described in detail below.

1. Time-to-frequency transform of the input using windowed DFTs
   in DFT block 80
2. Prediction of missing residual in frequency domain
   in upmixing and spatial restoration block 90
3. Upmixing in frequency domain
   in upmixing and spatial restoration block 90
4. ITD synthesis in frequency domain
   in ITD synthesis block 100
5. Frequency-to-time domain transform, windowing and overlap add
   in IDFT blocks 112, 122 and window blocks 111, 121

The time-to-frequency transform of the mono/downmix signal input signal dmx(τ) may be done in a similar way as for the input audio signals of the encoder in FIG. 2. In certain embodiments, a suitable amount of zero padding may be added for an ITD restoration in the frequency domain. This procedure may yield a frequency transform of the downmix signal in form of time-frequency bins $DMX_{t,k}$, k=0, . . . , K−1.

In order to restore the spatial properties of the downmix signal $DMX_{t,k}$, a second signal, independent of the transmitted downmix signal $DMX_{t,k}$, may be needed. Such a signal may e.g. be (re)constructed in upmixing and spatial restoration block 90 using the corrected residual gain $r_{t,b,corr}$ as comparison parameter—transmitted by an encoder such as the encoder in FIG. 2—and time delayed time-frequency bins of the downmix signal $DMX_{t,k}$ as given in equation (30):

$$\hat{\rho}_{t,k} = r_{t,b,corr}\sqrt{\frac{\sum_{k\in I_b}|DMX_{t,k}|^2}{\sum_{k\in I_b}|DMX_{t-d_b,k}|^2}}\,DMX_{t-d_b,k} \tag{30}$$

for $k\in I_b$.

In other embodiments, different approaches and equations may be used to restore the spatial properties of the downmix signal $DMX_{t,k}$ based on the transmitted at least one comparison parameter.

Moreover, upmixing and spatial restoration block 90 may perform upmixing by applying the inverse to the mid/side transform at the encoder using the downmix signal $DMX_{t,k}$ and the side gain $g_{t,b}$ as transmitted by the encoder as well as the reconstructed residual signal $\hat{\rho}_{t,k}$. This may yield decoded ITD compensated frequency transforms $\hat{L}_{t,k}$ and $\hat{R}_{t,k}$ given by equations (31) and (32) as $$\hat{L}_{t,k} = \frac{e^{i\beta}\left(DMX_{t,k}(1+g_{t,b})+\hat{\rho}_{t,k}\right)}{\sqrt{2}} \tag{31}$$

and $$\hat{R}_{t,k} = \frac{e^{i(\beta-IPD_b)}\left(DMX_{t,k}(1-g_{t,b})-\hat{\rho}_{t,k}\right)}{\sqrt{2}} \tag{32}$$

for $k\in I_b$, where β is the same absolute phase rotation parameter as in the downmixing procedure in equation (29).

Furthermore, as shown in FIG. 3, the decoded ITD compensated frequency transforms $\hat{L}_{t,k}$ and $\hat{R}_{t,k}$ may be received by ITD synthesis/decompensation block 100. The latter may apply the ITD parameter $ITD_t$ in frequency domain by rotating $\hat{L}_{t,k}$ and $\hat{R}_{t,k}$ as given in equations (33) and (34) to yield ITD decompensated decoded frequency transforms $\hat{L}_{t,k,decomp}$ and $\hat{R}_{t,k,decomp}$:

$$\hat{L}_{t,k,decomp} \leftarrow e^{i\frac{\pi}{K}ITD_t k}\hat{L}_{t,k} \tag{33}$$

and $$\hat{R}_{t,k,decomp} \leftarrow e^{-i\frac{\pi}{K}ITD_t k}\hat{R}_{t,k}, \tag{34}$$

In FIG. 3, the frequency-to-time domain transform of the ITD decompensated decoded frequency transforms in form of time-frequency bins $\hat{L}_{t,k,decomp}$ and $\hat{R}_{t,k,decomp}$, k=0, . . . , K−1 may be performed by IDFT blocks 112 and 122 respectively. The resulting time domain signals may subsequently be windowed by window blocks 111 and 121 respectively and added to the reconstructed time domain output audio signals $\hat{l}(\tau)$ and $\hat{r}(\tau)$ of the left and right audio channel.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] MPEG-4 High Efficiency Advanced Audio Coding (HE-AAC) v2

[2] Jürgen Herre, *FROM JOINT STEREO TO SPATIAL AUDIO CODING—RECENT PROGRESS AND STANDARDIZATION*, Proc. of the 7th Int. Conference on digital Audio Effects (DAFX-04), Naples, Italy, Oct. 5-8, 2004

[3] Christoph Tourney and Christof Faller, *Improved Time Delay Analysis/Synthesis for Parametric Stereo Audio Coding*, AES Convention Paper 6753, 2006

[4] Christof Faller and Frank Baumgarte, *Binaural Cue Coding Part II: Schemes and Applications*, IEEE Transactions on Speech and Audio Processing, Vol. 11, No. 6, November 2003

The invention claimed is:

1. A multi-channel encoder for encoding a multi-channel audio signal, comprising a comparison device configured to:

derive from audio signals for at least one pair of channels of the multi-channel audio signal, at least one inter-channel time difference (ITD) parameter being indicative of an inter-channel time difference ITD between the audio signals of the at least one pair of channels in an analysis window, compensate the ITD for the at least one pair of channels in a frequency domain, reached by applying a window function to the audio signals in the analysis windows to obtain windowed audio signals and subjecting the windowed audio signals to a predetermined frequency transform, by applying a circular shift onto the frequency transforms of the audio signals using the at least one ITD parameter to generate at least one pair of ITD compensated frequency transforms, compute, based on the at least one ITD parameter and energies and the inner product of the at least one pair of ITD compensated frequency transforms, as comparison parameters, at least one side gain of at least one pair of mid/side transforms of the at least one pair of ITD compensated frequency transforms, the at least one side gain being a prediction gain of a side transform from a mid transform of the at least one pair of mid/side transforms, and at least one residual gain describing an energy of a residual in a prediction of the side transform from the mid transform relative to an energy of the mid transform, the at least one residual gain being corrected using a scaling gain between the audio signals of the at least one pair of channels and a function approximating a normalized version of the autocorrelation function of the window function, and generate at least one downmix signal for the audio signals of the at least one pair of channels, wherein the comparison parameters are for restoring the audio signals of the at least one pair of channels from the at least one downmix signal, and wherein the multi-channel encoder is configured to encode the at least one downmix signal, the at least one ITD parameter and the comparison parameters for transmission to a decoder.

2. The multi-channel encoder according to claim 1, the comparison device being further configured to:

obtain the function by interpolation of the normalized version of the autocorrelation function of the analysis window stored in a look-up table.

3. The multi-channel encoder according to claim 1, the comparison device being further configured to:

generate the at least one downmix signal based on the at least one pair of ITD compensated frequency transforms.

4. A decoder for multi-channel audio signals configured to:

decode, from a bitstream, at least one downmix signal, at least one inter-channel time difference (ITD) parameter and comparison parameters, upmix the at least one downmix signal for restoring the audio signals of at least one pair of channels from the at least one downmix signal using the comparison parameters to generate a decoded version of at least one pair of ITD compensated frequency transforms, decompensate the ITD for the decoded version of the at least one pair of ITD compensated frequency transforms of the at least one pair of channels in the frequency domain by circular shift using the at least one ITD parameter to generate a decoded version of at least one pair of ITD decompensated frequency transforms, inverse frequency transform the decoded version of the at least one pair of ITD decompensated frequency transforms to generate at least one pair of decoded audio signals of the at least one pair of channels, wherein the comparison parameters comprise, computed based on the at least one ITD parameter and energies and the inner product of the at least one pair of ITD compensated frequency transforms, at least one side gain of at least one pair of mid/side transforms of the at least one pair of ITD compensated frequency transforms, the at least one side gain being a prediction gain of a side transform from a mid transform of the at least one pair of mid/side transforms, and at least one residual gain describing an energy of a residual in a prediction of the side transform from the mid transform relative to an energy of the mid transform, the at least one residual gain being corrected using a scaling gain between the audio signals of the at least one pair of channels and a function approximating a normalized version of the autocorrelation function $W_X(n)$ of an analysis window.

* * * * *